US011458996B2

(12) United States Patent
Ucar et al.

(10) Patent No.: US 11,458,996 B2
(45) Date of Patent: Oct. 4, 2022

(54) SYSTEMS AND METHODS TO ENABLE RECIPROCATION IN VEHICULAR MICRO CLOUD

(71) Applicant: Toyota Motor Engineering & Manufacturing North America, Inc., Plano, TX (US)

(72) Inventors: Seyhan Ucar, Mountain View, CA (US); Takamasa Higuchi, Mountain View, CA (US); Onur Altintas, Mountain View, CA (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 18 days.

(21) Appl. No.: 16/847,002

(22) Filed: Apr. 13, 2020

(65) Prior Publication Data
US 2021/0316759 A1 Oct. 14, 2021

(51) Int. Cl.
*B60W 60/00* (2020.01)
*G08G 1/00* (2006.01)
*H04W 4/40* (2018.01)

(52) U.S. Cl.
CPC .... *B60W 60/0017* (2020.02); *B60W 60/0011* (2020.02); *B60W 60/0025* (2020.02); *G08G 1/20* (2013.01); *H04W 4/40* (2018.02)

(58) Field of Classification Search
CPC ......... B60W 60/0017; B60W 60/0011; B60W 60/0025; G08G 1/20; H04W 4/40
See application file for complete search history.

(56) References Cited

U.S. PATENT DOCUMENTS 9,349,234 B2 5/2016 Ricci
10,166,991 B1 * 1/2019 Bai ...................... G08G 1/0112
(Continued)

FOREIGN PATENT DOCUMENTS

WO 2016161677 A1 10/2016

OTHER PUBLICATIONS

Alam et al., "Toward Social Internet of Vehicles: Concept, Architecture, and Applications," IEEE Access, vol. 3, p. 343-357 (2015).

*Primary Examiner* — James J Lee
*Assistant Examiner* — Alexander George Matta
(74) *Attorney, Agent, or Firm* — Christopher G. Darrow; Darrow Mustafa PC

(57) ABSTRACT

System, methods, and embodiments described herein relate to managing benefit distribution in a vehicular micro cloud in which a plurality of vehicle members collaboratively execute operations in an environment of the vehicular micro cloud. A disclosed method may include monitoring a distributed execution of a micro cloud operation initiated by the ego vehicle, determining a contribution level of a vehicle member of the vehicular micro cloud that contributed toward completing the micro cloud operation, storing a record indicating the contribution level, identifying an occurrence of an event, the event being a micro cloud interaction or encounter with the vehicle member subsequent to completion of the micro cloud operation, determining, based at least in part on the record indicating the contribution level, a reciprocal task that benefits the vehicle member, and executing the reciprocal task during the event.

20 Claims, 4 Drawing Sheets

(56) References Cited

U.S. PATENT DOCUMENTS

| | | |
|---|---|---|
| 2013/0318168 A1 | 11/2013 | Demain et al. |
| 2014/0095695 A1 | 4/2014 | Wang et al. |
| 2014/0149514 A1 | 5/2014 | Ryan et al. |
| 2017/0200370 A1* | 7/2017 | Miller ................. G08G 1/162 |
| 2019/0079659 A1 | 3/2019 | Adenwala et al. |
| 2019/0132819 A1 | 5/2019 | Tseng et al. |
| 2019/0312779 A1* | 10/2019 | Magzimof ............. H04L 41/16 |
| 2019/0392468 A1* | 12/2019 | Stanciu ............... G06Q 20/405 |
| 2020/0081992 A1* | 3/2020 | Lynch ............... G06F 16/24578 |
| 2020/0090203 A1* | 3/2020 | Reichenbach ..... G06Q 30/0217 |
| 2020/0118444 A1* | 4/2020 | Wen ..................... G07C 5/008 |
| 2020/0201353 A1* | 6/2020 | Martin ................ G05D 1/0276 |

* cited by examiner

| VID | Track Attributes | Operation | Data DL | Data PR | Pro Time | Complete |
|---|---|---|---|---|---|---|
| 1427 | DW13957 | DL_Movie | 403mb | 0 | 1:03 | 1 |
| 1428 | IMG_115, IMG_116 | Obj_Det_Process | 0 | 750m | 15:42 | 0 |
| 1427 | DW13957 | DL_Songs | 189mb | 0 | :38 | 1 |

| | |
|---|---|
| VID | Rating |
| 1427 | 608 |
| 1428 | 773 |
FIG. 4    400
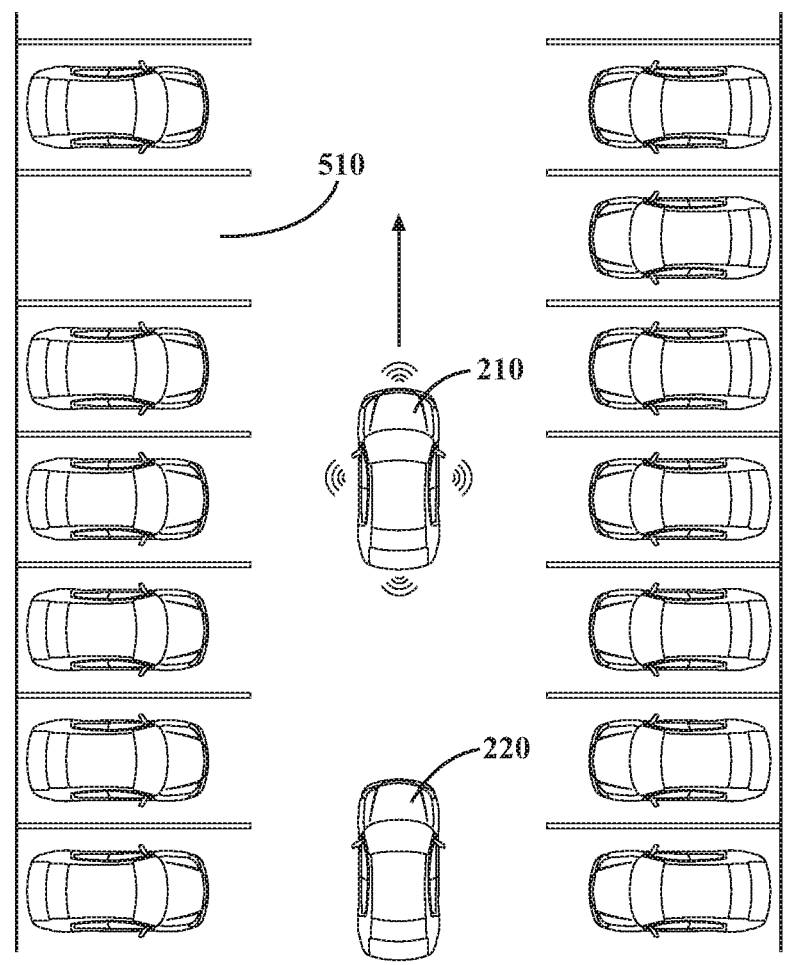
FIG. 5    500

SYSTEMS AND METHODS TO ENABLE RECIPROCATION IN VEHICULAR MICRO CLOUD

TECHNICAL FIELD

The subject matter described herein relates, in general, to a system and method for controlling task distribution and rewards in a vehicular micro cloud, and, more particularly, to balancing a distribution of reciprocal tasks and rewards in accordance with vehicular micro cloud contribution activities.

BACKGROUND

Two or more vehicles can establish communications connections to form a group of interconnected vehicles (e.g., via vehicle-to-everything, i.e., "V2X") that are located within a common vicinity. Such groups are known as "vehicular micro clouds" or simply "micro clouds." Vehicle members in a micro cloud (i.e., "members") can have varying types of computing resources and capabilities, for example, depending on the model/make of the vehicle. Members in a micro cloud can share their computing resources with other members of the micro cloud to collaborate on operational tasks, such as, for example, environmental sensing, data processing and data storage.

Since vehicle members can be equipped with varying degrees of capability, the benefits of participating in a vehicular micro cloud may skew disproportionately toward vehicle members that have relatively low capabilities that may be applied to shared micro cloud operations as compared to vehicle members that have relatively high capabilities applicable to shared micro cloud operations. That is, the higher capability vehicle members may carry a heavier load without receiving a return for the expenditure of resources.

SUMMARY

The disclosed devices, systems and methods relate to controlling distribution of benefits among members of a vehicular micro cloud that collaboratively executes one or more micro cloud operations on behalf of its members.

In one embodiment, a system, associated with an ego vehicle, for managing benefit distribution in a vehicular micro cloud in which a plurality of vehicle members collaboratively execute operations in an environment of the vehicular micro cloud includes a communication system configured to transmit/receive communications between the system and one or more of the plurality of vehicle members, one or more processors, and a memory communicably coupled to the one or more processors. The memory can store a monitoring module including instructions that when executed by the one or more processors cause the one or more processors to monitor a distributed execution of a micro cloud operation initiated by the ego vehicle, determine a contribution level of a vehicle member of the vehicular micro cloud that contributed toward completing the micro cloud operation, and store a record indicating the contribution level.

The memory can also store a tracking module including instructions that when executed by the one or more processors cause the one or more processors to identify an occurrence of an event, the event being a micro cloud interaction or encounter with the vehicle member subsequent to completion of the micro cloud operation.

In addition, the memory can store a response module including instructions that when executed by the one or more processors cause the one or more processors to determine, based at least in part on the record indicating the contribution level, a reciprocal task that benefits the vehicle member and execute the reciprocal task during the event.

In another embodiment, a method for managing benefit distribution in a vehicular micro cloud in which a plurality of vehicle members collaboratively execute operations in an environment of the vehicular micro cloud includes monitoring a distributed execution of a micro cloud operation initiated by an ego vehicle, determining a contribution level of a vehicle member of the vehicular micro cloud that contributed toward completing the micro cloud operation and storing a record indicating the contribution level.

The method further includes identifying an occurrence of an event, the event being a micro cloud interaction or encounter between the ego vehicle and the vehicle member subsequent to completion of the micro cloud operation, determining, based at least in part on the record indicating the contribution level, a reciprocal task that benefits the vehicle member and executing, by the ego vehicle, the reciprocal task during the event.

In still another embodiment, a non-transitory computer-readable medium for managing benefit distribution in a vehicular micro cloud in which a plurality of vehicle members collaboratively execute operations in an environment of the vehicular micro cloud includes instructions that, when executed by one or more processors, cause the one or more processors to monitor a distributed execution of a micro cloud operation initiated by an ego vehicle, determine a contribution level of a vehicle member of the vehicular micro cloud that contributed toward completing the micro cloud operation and store a record indicating the contribution level.

The instructions further cause the one or more processors to identify an occurrence of an event, the event being a micro cloud interaction or encounter between the ego vehicle and the vehicle member subsequent to completion of the micro cloud operation, determine, based at least in part on the record indicating the contribution level, a reciprocal task that benefits the vehicle member, and execute, by the ego vehicle, the reciprocal task during the event.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

FIG. 4 illustrate an example database table that stores an adjustable balance rating for each contributing vehicle according to the disclosed embodiments.

FIG. 5 illustrates an example encounter according to the disclosed embodiments.

DETAILED DESCRIPTION

Figure 1:
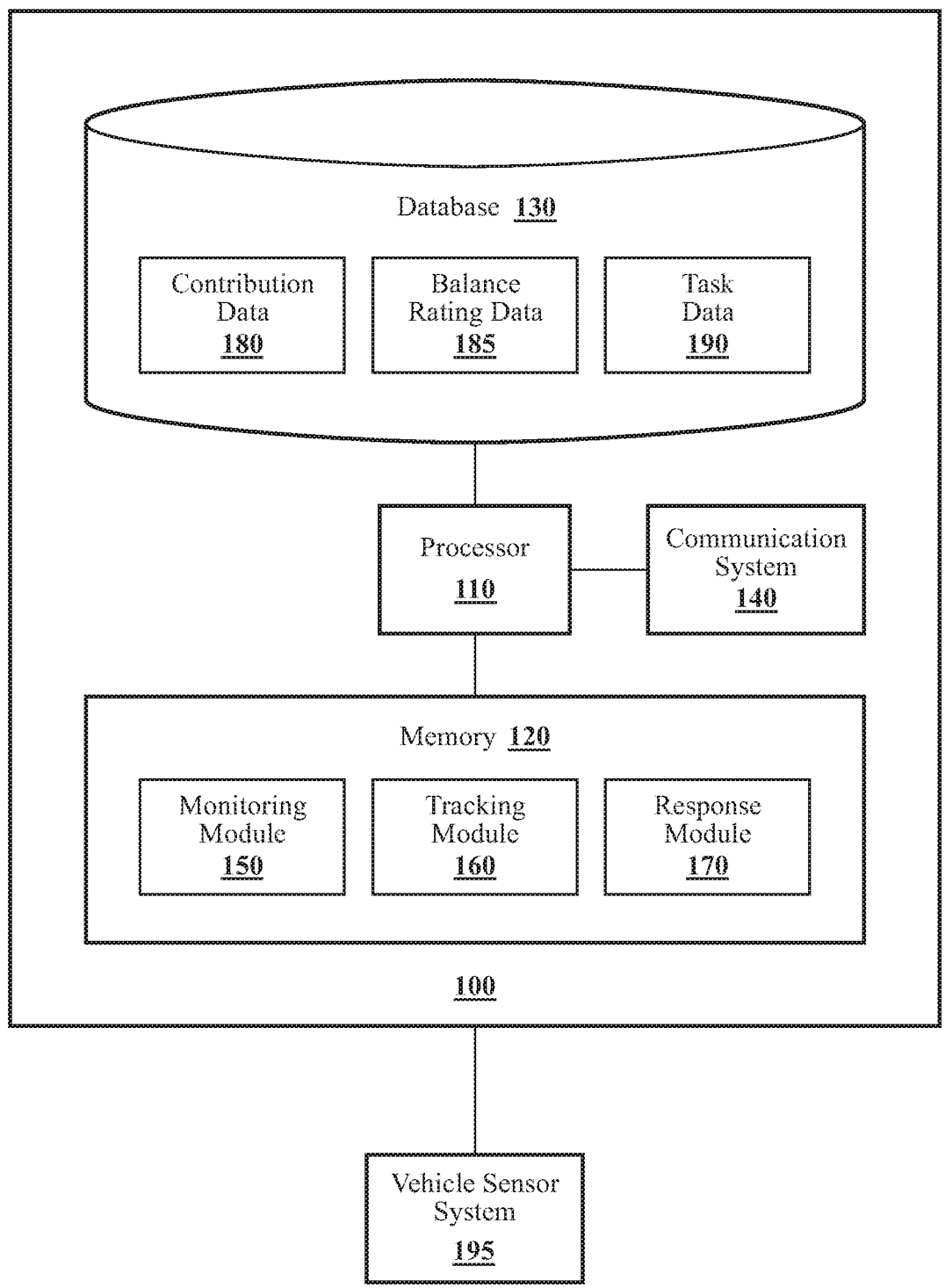
FIG. 1 illustrates one embodiment of an automated reciprocation system according to the disclosed embodiments.

Systems, methods, and other embodiments associated with managing distribution of benefits in accordance with micro cloud activity are disclosed. Herein, a "micro cloud operation" refers to a task (e.g., a computational task, sensing task, network task, communication task, etc.) performed in the micro cloud environment and that two or more connected vehicles or members in a micro cloud contribute to completing. As previously mentioned, vehicle members in a vehicular micro cloud can have and share varying types of resources and capabilities. For example, a first vehicle in a micro cloud may be equipped with low quality front-facing sensors while in contrast a second vehicle in the same micro cloud may be equipped with high quality front-facing sensors. As another example, a first vehicle may include a relatively low amount of data storage capacity while a second vehicle may include a relatively high amount of data storage capacity. As such, one of the advantages of forming a vehicular micro cloud is providing the members with access to a potentially higher quality or more powerful set of resources via the micro cloud network.

However, the same factors that provide advantages for some members of a vehicular micro cloud may conversely result in detriment to other members. For example, due to disparity in capability (processing power, sensor quality, storage capacity, etc.) across the membership, members that have a relatively low level of capability may receive a disproportionate amount of benefit from participating in the vehicular micro cloud compared to members that have a relatively high level of capability. That is, for example, a low capability member may repeatedly initiate a micro cloud operation that will benefit the low capability member (e.g., download media content), but the operation is largely completed by high capability members (e.g., members having faster network connections).

Even among a vehicular micro cloud having a substantially even distribution of capabilities, due to the nature of collaborative task execution a disproportionate load may still be carried by a limited number of members. In one example case, a limited set of members may have the best equipment for a given task that is frequently performed by the vehicular micro cloud. When such circumstances produce disparate results, high capability vehicle members may be discouraged from participating in the vehicular micro cloud as their participation amounts to expending additional resources without receiving a proportionate amount of benefit in return. Moreover, drivers of low capability vehicles may have a desire to provide, in some way, a fair return for received services.

Therefore, an automated reciprocation system and associated methods are disclosed herein that provides an approach for managing benefit distribution in a vehicular micro cloud in which two or more of the vehicle members collaboratively execute operations in an environment of the vehicular micro cloud. In one or more embodiments, the disclosed reciprocation system can be associated with an ego vehicle, i.e., installed in the ego vehicle or otherwise in communication with the ego vehicle. In one or more embodiments, the disclosed reciprocation system can monitor distributed execution of a micro cloud operation initiated by the ego vehicle, determine a contribution level of a vehicle member of the vehicular micro cloud that contributed toward completing the micro cloud operation, and store a record indicating the contribution level. For example, the ego vehicle can submit a task for execution by the vehicular micro cloud, e.g., download a movie for a road trip. A vehicle member of the micro cloud (i.e., a contributing member other than the ego vehicle) may contribute to completing the task, for example, by downloading data for the movie and transmitting the data to the ego vehicle. The disclosed system can determine a contribution level, e.g., how many megabytes of data the contributing member downloaded, and store a record of the contribution level.

After the task has been completed, the disclosed system can proactively evaluate vehicles in a vicinity of the ego vehicle to identify an event involving the contributing member. For example, the event can be an encounter (e.g., the contributing vehicle and ego vehicle happen to be in the same area) or an interaction (e.g., the contributing vehicle requests help in completing a task).

Upon detecting the event, the disclosed system can determine, based at least in part on the record indicating the contribution level, a reciprocal task that benefits the contributing member and execute the reciprocal task. The reciprocal task can include, for example, contributing extra resources to a micro cloud operation initiated by the contributing member, prioritizing contributing toward completion of a micro cloud operation initiated by the contributing member, or providing a reward outside of the environment of the vehicular micro cloud, such as yielding right-of-way, giving up a parking space, etc. The disclosed system can record completion of the reciprocal task, thereby completing a balancing of benefit distribution among the micro cloud members and encouraging continued participation in the vehicular micro cloud.

Referring to FIG. 1, one example embodiment of an automated reciprocation system 100 is illustrated. The automated reciprocation system 100 can be implemented, for example, installed in an ego vehicle or a central server, a cloud server, an edge serve, a cloud-based computing device or other network-connected computing device that can communicate with one or more external devices, or a cluster of connected devices (e.g., road-side units, stationary vehicles, etc.). The automated reciprocation system 100 is shown including a processor 110, a memory 120, database 130, and a communication system 140 and in communication with a vehicle sensor system 195. In other embodiments more or fewer components than those shown can be included according to an implementation of the disclosed subject matter.

In one or more embodiments, the processor 110 may be a part of the automated reciprocation system 100, or the automated reciprocation system 100 may access the processor 110 through a network communication. The processor 110 may be one or more processors according the processing power required per implementation.

The memory 120 can be implemented as a random-access memory (RAM), read-only memory (ROM), a hard-disk drive, a flash memory, or other suitable memory for storing, among other things, a monitoring module 150, a tracking module 160 and a response module 170. The modules 150, 160 and 170 will be described further below.

The database 130 can store, among other information, contribution data 180, balance rating data 185, and task data 190, which will be also described further below. The database 130 is, in one or more embodiments, an electronic data structure that can be a data store integral with the automated reciprocation system 100, a removable memory device that can be installed in or removed from the automated reciprocation system 100, or another network-based data store that is accessible to modules 150, 160 and 170 stored in the memory 120. In one or more embodiments the database 130 can be accessible to external systems, such as cloud or edge servers, micro cloud members, or road-side units. The database 130 is configured with routines that can be executed by the processor 110 for analyzing stored data, accessing and providing stored data, organizing stored data, and so on. Thus, in one embodiment, the database 130 stores and manages/updates data, such as contribution data 180, balance rating data 185 and task data 190, as well as other types of data that is used by modules 150, 160 and 170 in executing various functions.

The communication system 140 can be implemented as, for example, a wireless communication system including one or more transmitting/receiving devices, one or more transmitting/receiving antennas and a controller for transmitting and receiving data over a wireless network using any of a variety of protocols, such as vehicle-to-vehicle (V2V), vehicle-to-everything (V2X), general packet radio service (GPRS), Universal Mobile Telecommunications System (UMTS), Code Division Multiple Access 2000 (CDMA2000), CDMA2000 1×(1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol. The communication system 140 can also include vehicle-to-cloud, vehicle-to-datacenter and any type of V2X communication protocol. In one or more embodiments, the communication system 140 can be configured to transmit or receive, for example, contribution data 180, balance rating data 185 and task data 190 from one or more entities, such as various members of the micro cloud.

The modules 150, 160 and 170 can be, for example, constructed as computer-readable instructions that when executed by the processor 110 cause the processor 110 to perform the various functions disclosed herein.

The monitoring module 150 generally includes instructions that function to control the processor 110 to monitor a distributed execution of a micro cloud operation initiated by the system, determine a contribution level of a vehicle member of the vehicular micro cloud that contributed toward completing the micro cloud operation, and store a record indicating the contribution level (e.g., as contribution data 180 stored in the database 130). In one or more embodiments, the micro cloud operation(s) can include one or more of: performing a shared computational task among multiple micro cloud members (e.g., image/video processing, object detection, etc.), downloading/storing/updating data content (e.g., downloading or streaming movie or music), performing environmental sensing by on-board sensors (e.g., scanning road conditions, detecting obstacles, etc.), transmitting data between an external system and micro cloud members (e.g., obtaining or reporting weather/road conditions to a cloud service, etc.), or other types of operations that a vehicle may initiate in a vehicular micro cloud context.

The tracking module 160 generally includes instructions that function to control the processor 110 to identify an occurrence of an event, the event being an interaction or encounter with the vehicle member subsequent to completion of the micro cloud operation. For example, in one or more embodiments the tracking module 160 can, subsequent to completion of the micro cloud operation, detect a vehicle in a vicinity around the system 100 vehicle, analyze one or more attributes of the vehicle to determine a pseudo-identity of the vehicle and identify whether the determined pseudo-identity matches a pseudo-identity of the contributing vehicle. In one or more embodiments, the pseudo-identity can include, for example, a license plate number, one or more captured images (e.g., showing vehicle type, shape color, etc.), or other attributes that can be used to identify the contributing vehicle.

The response module 170 generally includes instructions that function to control the processor 110 to determine, based at least in part on the record indicating the contribution level, a reciprocal task that benefits the vehicle member and execute the reciprocal task during the event. The reciprocal task can be executed within the vehicular micro cloud environment or outside of the micro cloud environment entirely. For example, a reciprocal task within the micro cloud environment can comprise contributing to completion of an operation initiated by the vehicle member. In contrast, a reciprocal task outside of the micro cloud environment can comprise yielding the right-of-way at an intersection, allowing the vehicle member to take a parking space that the ego vehicle was preparing to occupy, providing an HOV lane rule-free pass, paying a priority lane entrance fee or toll road fee, etc.

Figures 2, 3:
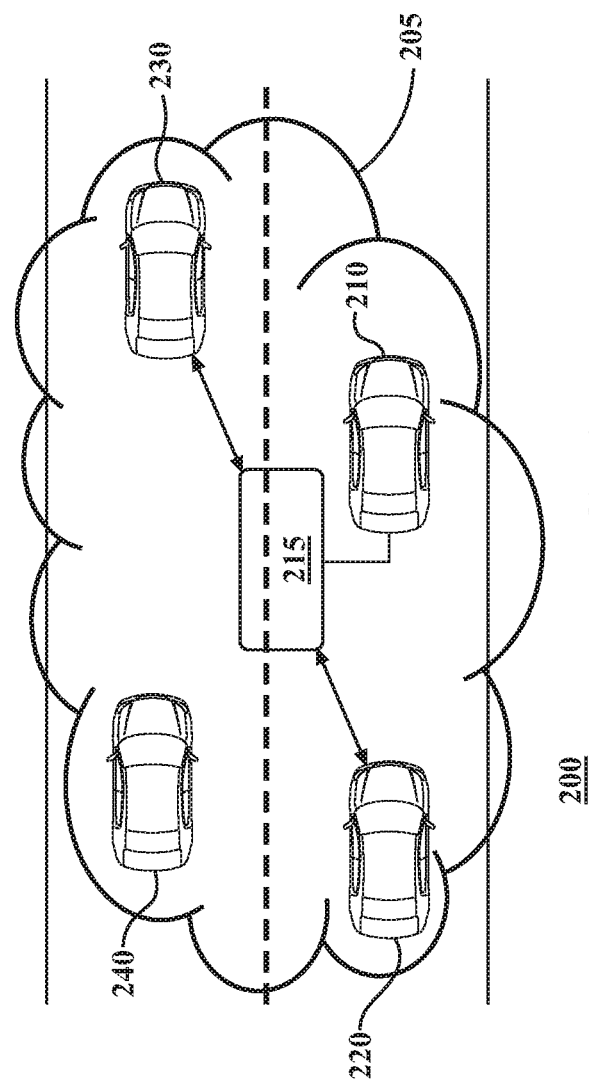
FIG. 2 illustrates an example scene in which the disclosed automated reciprocation system may be applied according to the disclosed embodiments.
FIG. 3 illustrates an example database table that stores records of micro cloud operation contributions according to the disclosed embodiments.

FIG. 2 shows an example scene 200 in which the disclosed embodiments may be applied. In the example scene 200, a micro cloud 205 includes an ego vehicle 210 and three additional vehicle members 220, 230, 240. The ego vehicle 210 initiates a task and broadcasts or transmits a request for assistance from the micro cloud 205 in completing the task. Two vehicles 220, 230 respond and the task is elevated from a local task being handled solely by the ego vehicle 210 and becomes a micro cloud operation 215 in which all three vehicles 210-230 may contribute resources toward for completing. In the example scene 200, vehicle members 220 and 230 respond and contribute toward completing the micro cloud operation 215.

The micro cloud operation 215 can be, for example, downloading media content, processing image data for obstacle detection or navigation, or other types of micro cloud operations. Although a single micro cloud operation 215 is shown, it should be understood that the ego vehicle 210 may submit multiple tasks for collaborative execution by the micro cloud 205. In one or more implementations of the disclosed subject matter, two or more tasks may receive collaborative execution simultaneously or sequentially.

As the vehicle members 220, 230 contribute to completing the micro cloud operation 215, the monitoring module 150 monitors progress of the operation, determines a contribution level of each contributing vehicle and stores a record indicating the respective contribution levels.

FIG. 3 shows an example database table 300 that stores records of micro cloud operation contributions received by the ego vehicle. The database table 300 can be stored in the database 130 as part of the contribution data 180. Various aspects of the database table 300 will be described below, however, it should be understood that the database table 300 is merely one example table that the disclosed embodiments can implement for storing contribution data 180. More, fewer or different columns may be included as required per implementation, or a different data structure may be utilized for recording contribution levels.

The database table 300 can include a plurality of columns for storing different types of data including, for example, contributing vehicle member information 310, micro cloud operation identifier 320, contribution level tracking 330 and operation completion flag 340. The contributing vehicle member information 310 can include, for example, a vehicle identifier (VID) for wireless communication and vehicle tracking attributes (e.g., license plate number, pseudo-identity, etc.). Correlating FIGS. 2 and 3, the vehicle identifiers VID correspond with vehicle members of the micro cloud 205, i.e., VID 1427 corresponds with vehicle member 220 and VID 1428 corresponds with vehicle member 230. The contribution level tracking 330 can include different types of contribution parameters, such as an amount of data downloaded ("Data DL"), an amount of data processed ("Data PR"), an amount of processor time contributed ("Pro Time"), etc. The completion flag 340 can indicate whether the micro cloud operation is completed (e.g., "1") or not (e.g., "0").

For example, referring to FIGS. 2 and 3, during a first micro cloud operation of downloading a movie, vehicle member 220 may contribute to completing the task by downloading 403mb over a time of one minute and three seconds. Accordingly, monitoring module 150 stores a record indicating this contribution by assigning vehicle member 220 a vehicle ID ("1427"), obtaining identifiable tracking attributes associates with vehicle member 220 (e.g., license plate number "DW13957"), and storing a total amount of data downloaded (403mb) and processing time ("1:03") in contribution to completing the task. When movie download is complete, the monitoring module 150 can change the completion flag to "1".

Similarly, during a different micro cloud operation initiated by the ego vehicle 210, e.g., processing raw LIDAR data for object detection, vehicle member 230 may have superior image processing capability and contribute to completing the task. The monitoring module 150 can store a record indicating this contribution by assigning vehicle member 230 a vehicle ID ("1428"), obtaining identifiable tracking attributes associates with vehicle member 220 (e.g., multiple captured images of the vehicle), and storing a total amount of data processed (750m) and processing time ("15:42") in contribution to completing the task. For as long as the task is ongoing, the monitoring module 150 can allow the completion flag to remain set to "0".

In one or more embodiments, the monitoring module 150 can further include instructions to determine an adjustable balance rating indicating a total amount of contribution provided by the vehicle member over one or more interactions. For example, in addition to contributing to downloading a movie, vehicle member 220 may also contribute to downloading songs on a play list. The monitoring module 150 can determine a balance rating increment that indicates contributions related to each completed micro cloud operation and apply the increment to an adjustable balance rating for each contributing vehicle. Accordingly, the balance rating can indicate a total amount of (unmitigated) benefit that the ego vehicle has received from each contributing vehicle.

FIG. 4 shows an example database table 400 that stores an adjustable balance rating for each contributing vehicle. The database table 400 can store, for example, a vehicle ID 410 associated with a balance rating 420. It should be understood, however, that the database table 400 is merely one example table that the disclosed embodiments can implement for storing balance rating data 185. More, fewer or different columns may be included as required per implementation, or a different data structure may be utilized.

The precise formula the monitoring module 150 uses for translating balance rating data 185 for completed micro cloud operations into balance rating increments can vary per implementation. In one or more embodiments, the formula may be customized and/or predetermined per type of micro cloud operation. In one implementation, for purposes of illustration, the monitoring module 150 can determine a balance rating increment I for a completed micro cloud operation according to the formula:

$$I=(w1)D_d+(w2)D_p+(w3)C_t \qquad \text{Eq. 1}$$

where $D_d$ is the amount of data downloaded in megabytes, $D_p$ is the amount of data processed in megabytes, $C_t$ is the amount of processing time contributed in seconds, and w1, w2, and w3 are weight values.

In one or more embodiments, the weight values w1, w2, and w3 are set according to the capabilities of the ego vehicle. For example, in an implementation in which the ego vehicle has relatively low downloading capabilities and relatively high data processing capabilities, w1 may be increased relative to w2 to reflect a greater value associated with data download contributions. Furthermore, in one or more embodiments the weight values w1, w2, and w3 can be adjusted according to external factors such as road type, traffic conditions, weather status, etc.

By translating completed micro cloud operation contributions into balance rating increments in accordance with a set formula, e.g., Eq. 1, the monitoring module 150 ensures that large contributions and more valued contributions are accurately reflected in the balance rating.

After a micro cloud operation is completed and balance rating data 185 has been stored indicating the contributions of a vehicle member, the tracking module 160 scans available tracking data to identify an "event". As used herein, an "event" is defined as either an encounter with the contributing vehicle member or a micro cloud interaction with the contributing vehicle member.

As used herein, a "micro cloud interaction" refers to an interaction in which the contributing member initiates a task for collaboration by a vehicular micro cloud or otherwise transmits a request for collaboration or help in completing a task and the ego vehicle responds affirmatively, receives data indicating parameters of the task and proceeds to contribute to completion of the task. More generally, a micro cloud interaction is a collaboration occurrence within the micro cloud environment that benefits the contributing vehicle member.

An "encounter", as used herein, refers to a situation in which the ego vehicle directly detects the presence of the contributing vehicle member in a vicinity of the ego vehicle with or without an established vehicular micro cloud connection, or the ego vehicle indirectly detects the contributing member through another system, such as a cloud or edge server. That is, an encounter encompasses: 1) a chance crossing of paths between the ego vehicle and the contributing vehicle outside of the vehicular micro cloud environment, i.e., both vehicles happening to be in or around the same place at the same time regardless of whether a vehicular micro cloud is established, and 2) a chance detection of the contributing vehicle by a system (e.g., a cloud or edge server that has access, for example, to toll booth or HOV lane cameras) that is in communication with or associated with the ego vehicle.

In one or more embodiments, the tracking module 160 can scan available data received, for example, from the communication system 140 and the vehicle sensor system 195. The tracking module 160 can identify a wireless communication associated with the VID of a contributing vehicle, e.g., a communication indicating initiation of a micro cloud operation, and thereby identify the communication as an event. Similarly, the tracking module 160 can scan sensor data received from the vehicle sensor system 195 to search for instances of tracking attributes (e.g., stored in database table 300, FIG. 3) that are associated with a former contributing vehicle. For example, in one or more embodiments the tracking attributes may include a license plate number of the contributing vehicle obtained by image capture from a camera of the vehicle sensor system 195, or multiple images of the contributing vehicle captured by the camera of the vehicle sensor system 195 that can otherwise be used to identify the contributing vehicle above a threshold level of accuracy.

When the tracking module 160 identifies an event (i.e., a micro cloud interaction or an encounter) associated with a former contributing vehicle member, the response module 170 determines, based at least in part on the record indicating the contribution level of the vehicle member (i.e., the balance rating data 185), a reciprocal task that benefits the former contributing vehicle member and executes the reciprocal task during the event.

In one or more embodiments, the reciprocal tasks and their respective parameters can be stored in the database 130 as task data 190, categorically defined as having applicability dependent upon the type of event that is identified. For example, when the event is a micro cloud interaction, the response module 170 can select a reciprocal task having parameters of execution for within a vehicular micro cloud (e.g., prioritizing contributing to a micro cloud operation initiated by the vehicle member). When the event is an encounter and the response module 170 determines that the ego vehicle and contributing member are not currently operating in a common vehicular cloud, the response module 170 can select a reciprocal task having parameters of execution for outside of a vehicular cloud (e.g., yielding right-of-way at an intersection).

In one or more embodiments, the response module 170 can determine a value or rating for a reciprocal task. For example, for a reciprocal task having parameters of execution within a vehicular micro cloud, the response module 170 can determine a rating in a similar manner used for determining a balance rating for a contribution, e.g., using a formula such as Eq. 1. For a reciprocal task having parameters of execution for outside a vehicular micro cloud, the response module 170 can determine a rating according to a custom formula or a predetermined value (e.g., yielding right-of-way can have a predetermined rating of 300).

Upon completion of a reciprocal task directed toward a vehicle, the response module 170 can adjust the balance rating associated with the vehicle to reflect completion of the reciprocal task in accordance with the value of the reciprocal task. In this manner the disclosed system can determine one or more reciprocal tasks that, in sum, are proportionate to the contribution received in completing the original micro cloud operation(s).

FIG. 5 shows an example encounter 500 between an ego vehicle 210 and a vehicle 220, the vehicle 220 having previously contributed to completing a micro cloud operation initiated by the ego vehicle 210. The encounter 500 is taking place in a parking lot, outside of a vehicular micro cloud environment, i.e., the ego vehicle 210 and the vehicle 220 are not currently in a common vehicular micro cloud.

The tracking module 160 scans sensor data from the ego vehicle 210, determines (e.g., based on license plate information from captured image data) that the vehicle 220 detected behind the ego vehicle 210 is one that previously contributed to completing a micro cloud operation initiated by the ego vehicle (e.g., by determining, according to the balance rating data 185, that a VID associated with the vehicle 220 has a positive balance rating), and thereby identifies the encounter 500 as an event.

The response module 170 checks the balance rating data 185 to determine a current balance rating associated with the vehicle 220 and determines an appropriate reciprocal task having parameters of execution for outside of a vehicular micro cloud. For example, the ego vehicle 210 is currently approaching an empty parking space 510. The response module 170 can determine that a potential reciprocal task of yielding a parking space is assigned a pre-determined value rating of 400. The response module 170 can further determine from the balance rating data 185 that the vehicle 220 currently has an associated balance rating, e.g., of 608. Based on this information, the response module 170 can determine that yielding the parking space 510 to the vehicle 220 is an appropriate reciprocal response that benefits the vehicle 220 and can execute the reciprocal response, i.e., cause the ego vehicle 210 to proceed forward and yield the parking space 510 to the vehicle 220.

Upon completion of executing the reciprocal response, the response module 170 can adjust the balance rating associated with the vehicle 220 to reflect that a reciprocal response has been carried out. For example, in one or more embodiments, the response module 170 can reduce the balance rating by an amount equal to the rating of the reciprocal response. Continuing the example provided above, the response module 170 can reduce the balance rating of 608 by an amount of 400, resulting in a new balance rating of 208 associated with the vehicle 220. In one or more embodiments, the response module 170 can transmit a message to the vehicle 220 indicating a reason as to why the reciprocal response was executed (e.g., "We are yielding this space to you in response to your help in downloading a movie on March 27. Thank you!")

In this manner the disclosed automated reciprocation system 100 can provide a way to balance distribution of benefits that may be achieved in a micro cloud environment. The disclosed automated reciprocation system 100 can search for and facilitate exchanges that reduce the likelihood that high capability vehicles continually expend resources aiding low capability vehicles and not receive any return.

Although the above-discussed example relates to improving benefit distribution in a context of receiving a micro cloud operation benefit and in response executing a reciprocal task outside of the micro cloud environment, the disclosed subject matter is not limited to this type of exchange. It should be understood that in implementation any number of benefits may accrue, and the reciprocal tasks may take place in or out of the micro cloud environment. The exchanges may continue on an ongoing basis and among multiple vehicles, even going back and forth, with each have respective balance ratings or other methods of tracking contribution levels.

Figure 6:
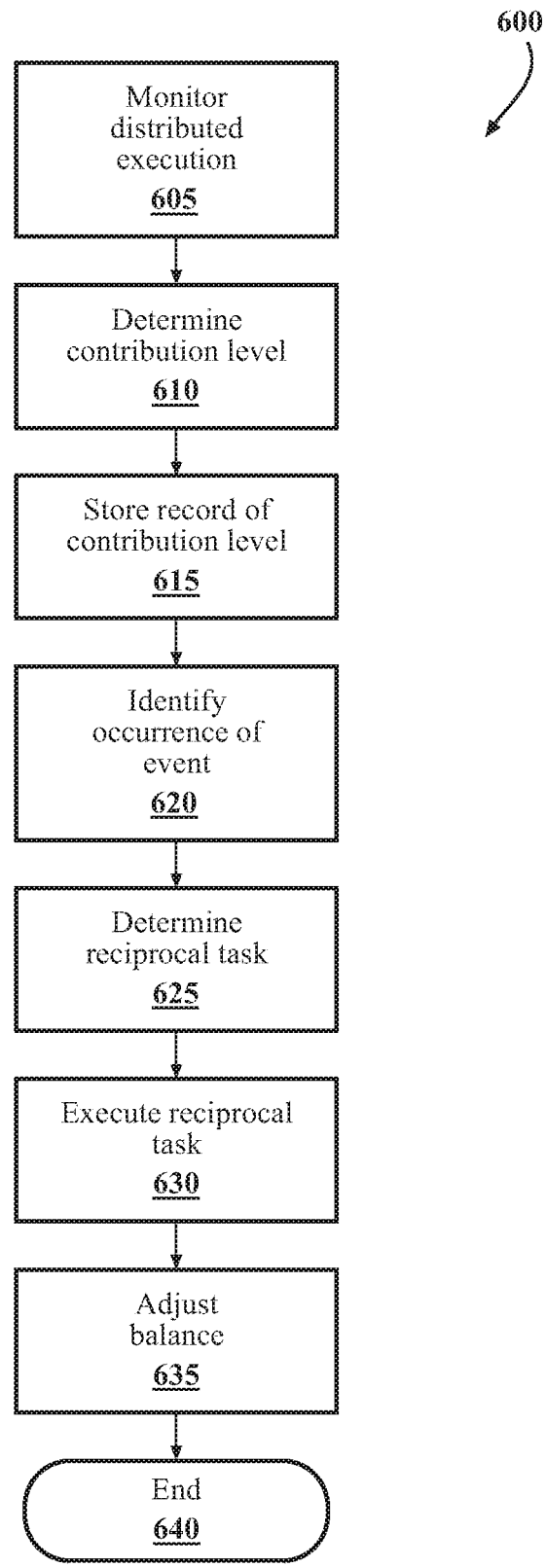
FIG. 6 illustrates a flowchart of managing benefit distribution in a vehicular micro cloud according to the disclosed embodiments.

FIG. 6 illustrates a flowchart of a method 600 of managing benefit distribution in a vehicular micro cloud according to the disclosed embodiments. The method 600 can be implemented in a vehicular micro cloud environment in which a plurality of vehicle members collaboratively execute operations. Method 600 will be discussed from the perspective of the automated reciprocation system 100 of FIG. 1. While method 600 is discussed in combination with the automated reciprocation system 100, it should be understood that the method 600 is not limited to implementation within the automated reciprocation system 100, which is merely one example of a system that may implement the method 600. It should further be understood that the order of operations can change in various implementations of the method 600.

At operation 605, the automated reciprocation system 100 (e.g., monitoring module 150) monitors a distributed execution of a micro cloud operation initiated by the ego vehicle. The micro cloud operation can include, for example, one or more, of performing a shared computational task, downloading, storing or updating data contents, performing environmental sensing and/or object detection, and transmitting data between an external system and one or more of the plurality of vehicle members.

At operation 610, the automated reciprocation system 100 (e.g., monitoring module 150) determines a contribution level of a vehicle member of the vehicular micro cloud that contributed toward completing the micro cloud operation. In one or more embodiments, the monitoring module 150 can determine the contribution level according to one or more contribution factors, including an amount of data downloaded, an amount of data processed, and an amount of processor time expended on the micro cloud operation. The contribution factors may be recorded as contribution data 180.

Furthermore, in one or more embodiments the monitoring module 150 can determine a balance indicating a total amount of contribution provided by the vehicle member over one or more interactions. For example, the monitoring module can use a formula to translate contribution data into a balance rating.

At operation 615, the automated reciprocation system 100 (e.g., monitoring module 150) stores a record indicating the contribution level. For example, in one or more embodiments the monitoring module 150 can store the balance rating as balance rating data 185, in the database 130, in association with the vehicle member.

At operation 620, the automated reciprocation system 100 (e.g., tracking module 160) identifies an occurrence of an event, the event being a micro cloud interaction or encounter between the ego vehicle and the vehicle member subsequent to completion of the micro cloud operation. An interaction is initiated by a communication between the ego vehicle and the vehicle member within the vehicular micro cloud environment. An encounter occurs when the ego vehicle detects the vehicle member in a vicinity of the ego vehicle without the two vehicles participating in a common vehicular micro cloud.

In one or more embodiments, the tracking module 160 can identify the occurrence of the event based at least in part on an analysis of sensor data, obtained from a sensor system of the ego vehicle, indicating one or more aspects of the vehicle member. In one or more embodiments, the tracking module 160 can identify the occurrence of the event based at least in part on a communication received from the vehicle member.

At operation 625, the automated reciprocation system 100 (e.g., response module 170) determines, based at least in part on the record indicating the contribution level (e.g., balance rating data 185), a reciprocal task that benefits the vehicle member. In one or more embodiments, a plurality of reciprocal tasks and their respective parameters can be stored in the database 130 as task data 190, categorically defined as having applicability dependent upon the type of event that the tracking module 160 identified. In one or more embodiments, the response module 170 can determine a rating value for each of the plurality of reciprocal tasks and can select a task having a rating value less than the balance rating associated with the vehicle member.

At operation 630, the automated reciprocation system 100 (e.g., response module 170) executes (i.e., by the ego vehicle) the reciprocal task during the event. For example, if the reciprocal task is prioritizing completion of a micro cloud operation initiated by the vehicle member, the ego vehicle will forgo other tasks to the extent possible and dedicate resources to completion of the micro cloud operation initiated by the vehicle member. In another example, if the reciprocal task is yielding right-of-way at an intersection, the ego vehicle will operate to brake and yield right-of-way.

At operation 635, the automated reciprocation system 100 (e.g., response module 170) adjusts the balance, upon completion of the reciprocal task, to reflect completion of the reciprocal task in accordance with the value. For example, in one or more embodiments the response module 170 reduces the balance rating associated with the vehicle member by an amount equal to the rating value of the reciprocal task. The method ends at operation 640 and may repeat thereafter.

Thus, the disclosed automated reciprocation system 100 can continually redistribute benefits received among vehicles that collaborate in a vehicular micro cloud. The disclosed automated reciprocation system 100 can provide an equitable solution to the problem of low capability vehicles disproportionality receiving the benefits of collaborating in a vehicular micro cloud and thereby incentivize participation by high capability vehicles.

As discussed above, the automated reciprocation system 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data stores of the automated reciprocation system (e.g., database 130) may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-6, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A system, associated with an ego vehicle, for managing benefit distribution in a vehicular micro cloud in which a plurality of vehicle members collaboratively execute operations in an environment of the vehicular micro cloud, comprising:

a communication system configured to transmit/receive communications between the system and one or more of the plurality of vehicle members;

one or more processors; and a memory communicably coupled to the one or more processors and storing:

a monitoring module including instructions that when executed by the one or more processors cause the one or more processors to:

monitor a distributed execution of a micro cloud operation initiated by the ego vehicle, determine, according to at least two contribution factors, a contribution level of a vehicle member of the vehicular micro cloud that contributed toward completing the micro cloud operation, and store a record indicating the contribution level, wherein the at least two contribution factors are selected from the group consisting of:
an amount of data downloaded,
an amount of data processed, and
an amount of processor time expended on the micro cloud operation, and
multiply:
a first contribution factor, of the at least two contribution factors, by a first weight, and
a second contribution factor, of the at least two contribution factors, by a second weight,
wherein in response to a value of the first contribution factor being relatively low and a value of the second contribution being relatively high, a value of the first weight relative to a value of the second weight is increased;
a tracking module including instructions that when executed by the one or more processors cause the one or more processors to identify an occurrence of an event, the event being a micro cloud interaction or encounter with the vehicle member subsequent to completion of the micro cloud operation; and
a response module including instructions that when executed by the one or more processors cause the one or more processors to determine, based at least in part on the record indicating the contribution level, a reciprocal task that benefits the vehicle member and execute the reciprocal task during the event.

2. The system of claim 1, wherein the micro cloud operation includes one or more of:
performing a shared computational task,
downloading, storing or updating data contents,
performing environmental sensing and/or object detection, or
transmitting data between an external system and one or more of the plurality of vehicle members.

3. The system of claim 1, wherein:
the monitoring module further includes instructions to cause the one or more processors to determine a balance indicating a total amount of contribution provided by the vehicle member over one or more interactions; and
the response module further includes instructions to cause the one or more processors to determine a value for the reciprocal task and, upon completion of the reciprocal task, adjust the balance to reflect completion of the reciprocal task in accordance with the value.

4. The system of claim 1, wherein the tracking module further includes instructions to cause the one or more processors to identify the occurrence of the event based at least in part on an analysis of sensor data, obtained from a sensor system of the ego vehicle, indicating one or more aspects of the vehicle member.

5. The system of claim 1, wherein the tracking module further includes instructions to cause the one or more processors to identify the occurrence of the event based at least in part on a communication received from the vehicle member.

6. The system of claim 1, wherein the reciprocal task is executed outside of the environment of the vehicular micro cloud.

7. The system of claim 1, wherein the data downloaded are for media content.

8. A method for managing benefit distribution in a vehicular micro cloud in which a plurality of vehicle members collaboratively execute operations in an environment of the vehicular micro cloud, comprising:
monitoring a distributed execution of a micro cloud operation initiated by an ego vehicle;
determining, according to at least two contribution factors, a contribution level of a vehicle member of the vehicular micro cloud that contributed toward completing the micro cloud operation, wherein the at least two contribution factors are selected from the group consisting of:
an amount of data downloaded,
an amount of data processed, and
an amount of processor time expended on the micro cloud operation;
storing a record indicating the contribution level;
multiplying a first contribution factor, of the at least two contribution factors, by a first weight;
multiplying a second contribution factor, of the at least two contribution factors, by a second weight;
identifying an occurrence of an event, the event being a micro cloud interaction or encounter between the ego vehicle and the vehicle member subsequent to completion of the micro cloud operation;
determining, based at least in part on the record indicating the contribution level, a reciprocal task that benefits the vehicle member; and
executing, by the ego vehicle, the reciprocal task during the event,
wherein in response to a value of the first contribution factor being relatively low and a value of the second contribution being relatively high, a value of the first weight relative to a value of the second weight is increased.

9. The method of claim 8, wherein the micro cloud operation includes one or more of:
performing a shared computational task,
downloading, storing or updating data contents,
performing environmental sensing and/or object detection, or
transmitting data between an external system and one or more of the plurality of vehicle members.

10. The method of claim 8, further comprising:
determining a balance indicating a total amount of contribution provided by the vehicle member over one or more interactions;
determining a value for the reciprocal task; and
adjusting the balance, upon completion of the reciprocal task, to reflect completion of the reciprocal task in accordance with the value.

11. The method of claim 8, further comprising identifying the occurrence of the event based at least in part on an analysis of sensor data, obtained from a sensor system of the ego vehicle, indicating one or more aspects of the vehicle member.

12. The method of claim 8, further comprising identifying the occurrence of the event based at least in part on a communication received from the vehicle member.

13. The method of claim 8, further comprising executing the reciprocal task outside of the environment of the vehicular micro cloud.

14. A non-transitory computer-readable medium for managing benefit distribution in a vehicular micro cloud in which a plurality of vehicle members collaboratively execute operations in an environment of the vehicular micro cloud, including instructions that, when executed by one or more processors, cause the one or more processors to:
- monitor a distributed execution of a micro cloud operation initiated by an ego vehicle;
- determine, according to at least two contribution factors, a contribution level of a vehicle member of the vehicular micro cloud that contributed toward completing the micro cloud operation, wherein the at least two contribution factors are selected from the group consisting of:
  - an amount of data downloaded,
  - an amount of data processed, and
  - an amount of processor time expended on the micro cloud operation;
- multiply a first contribution factor, of the at least two contribution factors, by a first weight;
- multiply a second contribution factor, of the at least two contribution factors, by a second weight;
- store a record indicating the contribution level;
- identify an occurrence of an event, the event being a micro cloud interaction or encounter between the ego vehicle and the vehicle member subsequent to completion of the micro cloud operation;
- determine, based at least in part on the record indicating the contribution level, a reciprocal task that benefits the vehicle member; and
- execute, by the ego vehicle, the reciprocal task during the event,
- wherein in response to a value of the first contribution factor being relatively low and a value of the second contribution being relatively high, a value of the first weight relative to a value of the second weight is increased.

15. The method of claim 8, wherein the data downloaded are for media content.

16. The non-transitory computer-readable medium of claim 14, wherein the micro cloud operation includes one or more of:
- performing a shared computational task,
- downloading, storing or updating data contents,
- performing environmental sensing and/or object detection, or
- transmitting data between an external system and one or more of the plurality of vehicle members.

17. The non-transitory computer-readable medium of claim 14, further including instructions to cause the one or more processors to:
- determine a balance indicating a total amount of contribution provided by the vehicle member over one or more interactions;
- determine a value for the reciprocal task; and
- adjust the balance, upon completion of the reciprocal task, to reflect completion of the reciprocal task in accordance with the value.

18. The non-transitory computer-readable medium of claim 14, further including instructions to cause the one or more processors to identify the occurrence of the event based at least in part on an analysis of sensor data, obtained from a sensor system of the ego vehicle, indicating one or more aspects of the vehicle member.

19. The non-transitory computer-readable medium of claim 14, further including instructions to cause the one or more processors to identify the occurrence of the event based at least in part on a communication received from the vehicle member.

20. The non-transitory computer-readable medium of claim 14, wherein the data downloaded are for media content.

* * * * *